United States Patent
Grichnik

(10) Patent No.: US 6,539,319 B1
(45) Date of Patent: Mar. 25, 2003

(54) AUTOMATIC WAVELET GENERATION SYSTEM AND METHOD

(75) Inventor: Anthony J. Grichnik, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/183,187

(22) Filed: Oct. 30, 1998

(51) Int. Cl.[7] .............................................. G06F 19/00
(52) U.S. Cl. ........................ 702/75; 702/76; 702/189; 702/190; 702/66
(58) Field of Search ............................. 702/75, 17, 66, 702/74, 76, 77, 72, 73, 71, 112, 124, 126, 183, 189–191, 197, 198, 193–195, FOR 134, FOR 135, FOR 164, FOR 166, FOR 168, FOR 170, FOR 171, FOR 103, FOR 104, FOR 107, FOR 108, FOR 110; 324/76.19, 76.21, 76.22, 76.28, 76.29, 76.31, 76.47–76.76, 76.68; 342/192, 196, 90; 382/280, 235, 243, 274, 248, 250, 253, 239, 232, 233; 708/203, 403–405, 300, 309, 311, 819, 821, 400; 704/205, 206, 201, 227, 226, 229, 230; 348/398.1, 403.1, 408.1; 375/240.11

(56) References Cited

U.S. PATENT DOCUMENTS

| | | | |
|---|---|---|---|
| 5,453,945 A | | 9/1995 | Tucker ........................ 708/400 |
| 5,495,554 A | | 2/1996 | Edwards et al. ............. 704/205 |
| 5,740,036 A | | 4/1998 | Ahuja et al. .................. 702/17 |
| 5,757,309 A | | 5/1998 | Brooks et al. ................. 342/90 |
| 5,798,794 A | * | 8/1998 | Takahashi .............. 375/240.11 |
| 5,802,369 A | * | 9/1998 | Ganesh et al. ............... 382/232 |
| 5,819,215 A | * | 10/1998 | Dobson et al. .............. 704/230 |
| 5,825,935 A | * | 10/1998 | Murakoshi .............. 375/240.11 |
| 5,838,377 A | * | 11/1998 | Greene ..................... 348/398.1 |
| 5,889,559 A | * | 3/1999 | Yang ........................ 348/398.1 |
| 6,108,609 A | * | 8/2000 | Qian et al. .................... 702/66 |

FOREIGN PATENT DOCUMENTS

WO  WO 98/28917  * 7/1998

OTHER PUBLICATIONS

Luca et al., "Wavelet temporal profile of high–order harmonics emitted by a two–level atom in the presence of a laser pulse", article J. Phys B: At Mol Opt Phys 29 (1996) pp. 3277–3292, 1996 (No month).*

Fiordilino et al., "Temporal evolution of the spectrum emitted by a two–level atom in the presence of a laser field", Article from Journal of Modern Optics, vol. 43, no. 4, pp. 735–751, 1996 (No month).*

Trebino et al., "Measuring ultrashort laser pulses in the time–frequency domain using frequency–resolved optical gating", Rev. Sci. Instrum. 68(a), pp. 3277–3295, Sep. 1997.*

(List continued on next page.)

Primary Examiner—Hal Wachsman
(74) Attorney, Agent, or Firm—Maginot, Addison & Moore; Robin S Fahlberg; Steven G Kibby

(57) ABSTRACT

A wavelet generator for defining wavelets that represent a first signal includes a programmable filter bank, a frequency band controller coupled to the programmable filter bank, and a wavelet constructor coupled to the programmable filter bank. The programmable filter bank is operable to receive the first signal, and filter the first signal based upon a plurality of frequency bands to obtain a plurality of frequency band signals that each represent a frequency band of the first signal. The frequency band controller is also operable to receive the first signal. Moreover, the frequency band controller is further operable to obtain the plurality of frequency bands from the first signal, and program the programmable filter bank with the plurality of frequency bands. The wavelet constructor is operable to receive the plurality of frequency band signals.

20 Claims, 6 Drawing Sheets

OTHER PUBLICATIONS

Gopinath et al., "Optimal Wavelet Representation of Siganal and the Wavelet Sampling Theorem". IEEE Transactives on circuits and systems, vol. 4, No. 4, Apr. 1994.*

Chapa et al., "Optimal Matched Wavelet Construction and It's application to Image Pattern Recognition", SPIE vol. 2491, pp. 518–529, Jul. 1995.*

Articl Journal of Cmputational and Applied Mathematics 61 1995 (No month). 275–321 Application of generalized wavelets: An adaptive multiresolution scheme.

Article Pergamon 0895–7177 (94) E0004–7 Galerkin–Wavelet Modeling of Wave Propagation: Optimal Finite–Difference Stencil Design, pp. 31–38, 1994. (No month).

* cited by examiner

AUTOMATIC WAVELET GENERATION SYSTEM AND METHOD

TECHNICAL FIELD OF THE INVENTION

The present invention relates generally to signal processing and, more particularly to automatic generation of wavelets used for representing signals.

BACKGROUND OF THE INVENTION

In many different environments, signals may be monitored and analyzed to obtain information about the source of the signal. For example in one environment, electrodes of an electrocardiogram system may be positioned on a patient's body to sense and amplify electrocardiographic (ECG) signals originating from the patient's heart. The electrocardiogram system may record the monitored ECG signal for future analysis. A doctor using a signal analyzer may later retrieve the recorded ECG signals in order to obtain information about the condition of the patient's heart.

In another environment, a vibration sensor of a signal monitor may be positioned upon an operating automotive transmission to generate vibration signals that are indicative of the mechanical vibrations the transmission is experiencing during operation. Similar to the above ECG signals, the signal monitor may record the monitored vibration signals for future analysis. A technician using a signal analyzer may later analyze the recorded vibrations signals in order to determine whether the transmission has a mechanical defect.

In yet another environment, a vibration sensor of a signal monitor may be positioned to sense seismic vibrations that are indicative of geological phenomenon. Yet again, the signal monitor may record the monitored vibration signals for future analysis, and a researcher using a signal analyzer may later analyze the recorded vibrations signals.

In each of these environments, the monitored signals are recorded for future analysis. Typically, these signals are digitized to obtain a series of digital samples and the series of digital samples are stored. As a result of the digitization process, several thousand bytes of data a second may be generated in order to obtain a digital representation of the monitored signals. Accordingly, recording of the monitored signals for extended periods of times (e.g. days, months, years) can quickly become a problem due to the sheer number of digit samples that must be stored in order to accurately record the monitored signals.

In order to reduce the amount of data needed to accurately store signals, wavelet families have been defined. In particular, a wavelet family includes several wavelets that each define a time-varying signal over a period of time (e.g. a signal that varies in amplitude with respect to time over a period of 1 second). The wavelets of the wavelet family may be scaled in both the amplitude and time dimensions and combined to represent a signal. As a result, in order to store the monitored signals accurately, all that needs to be stored is the scaling components and the selection of wavelets over time. If the wavelet family is properly defined, then much less information needs to be stored than would be required to store the digital samples of the digitized signal.

Many well known wavelet families have been defined. In general, each wavelet family accurately and efficiently (i.e. requiring less bytes than directly storing digital samples of the signal) represents signals of a first type but does not represent signals of a second type as accurately or as efficiently. For example, a wavelet family defined for representing ECG signals may not be nearly as efficient in representing seismic signals.

As stated above, many wavelet families have been defined, and certain wavelet families are known to accurately and efficiently represent certain types of signals. Accordingly, a technician may configure a signal monitor to use an already defined wavelet family that is known to accurately and efficiently represent the types of signals being monitored by the signal monitored. Alternatively, a technician may repetitively configure the signal monitor with defined wavelet families until a suitable wavelet family for the signals being monitored is found.

A disadvantage of the above signal monitors is that a technician may need to try several wavelet families before a suitable wavelet family is found. This iterative configuring process may be quite time consuming. Moreover, there is no guarantee that a known wavelet family will accurately and efficiently represent the signal at hand.

Another disadvantage of the above signal monitors is that the signal being monitored may change enough over time that a wavelet family that once accurately and efficiently represented the monitored signal, no longer accurately and efficiently represents the monitored signal. Accordingly, a technician may be required to reconfigure the signal monitor with another wavelet family.

What is needed, therefore, is a method and apparatus that automatically define a plurality of wavelets to accurately and efficiently represent a monitored signal.

DISCLOSURE OF THE INVENTION

In accordance with one embodiment of the present invention, there is provided a method for defining wavelets that represent a first signal. The method includes the step of generating a first frequency band signal representative of a first frequency band of the first signal. The method also includes the step of generating a second frequency band signal representative of a second frequency band of the first signal. Another step of the method includes defining a first wavelet of the wavelets to represent the first frequency band signal. Yet another step of the method includes defining a second wavelet of the wavelets to represent the second frequency band signal.

Pursuant to another embodiment of the present invention, there is provided a wavelet generator for defining wavelets that represent a first signal. The wavelet generator includes a processor and a memory. The memory has stored therein instructions which when executed by the processor cause the processor to (i) generate a first frequency band signal representative of a first frequency band of the first signal, and (ii) generate a second frequency band signal representative of a second frequency band of the first signal. The instructions stored in the memory when executed by the processor also cause the processor to (iii) define a first wavelet of the wavelets to represent the first frequency band signal, and (iv) define a second wavelet of the wavelets to represent the second frequency band signal.

Pursuant to yet another embodiment of the present invention, there is provided a wavelet generator for defining wavelets that represent a first signal. The wavelet generator includes a programmable filter bank, a frequency band controller coupled to the programmable filter bank, and a wavelet constructor coupled to the programmable filter bank. The programmable filter bank is operable to receive the first signal, and filter the first signal based upon a plurality of frequency bands to obtain a plurality of frequency band signals that each represent a frequency band of the first signal. The frequency band controller is also operable to receive the first signal. Moreover, the frequency band controller is further operable to obtain the plurality of frequency bands from the first signal, and program the programmable filter bank with the plurality of frequency bands. The wavelet constructor is operable to receive the plurality of frequency band signals. The wavelet constructor is further operable to generate a separate wavelet for each of the plurality of frequency band signals.

It is an object of the present invention to provide a new method and apparatus for representing signals.

It is an object of the present invention to provide an improved method and apparatus for representing signals.

It is yet another object of the present invention to provide a method and apparatus that automatically define wavelets for representing signals.

It is still another object of the present invention to provide a method and apparatus that define wavelets for accurately representing signals.

Yet another object of the present invention is to provide a method and apparatus for defining wavelets that efficiently represent signals.

The above and other objects, features, and advantages of the present invention will become apparent from the following description and the attached drawings.

BEST MODE FOR CARRYING OUT THE INVENTION

Figure 1:
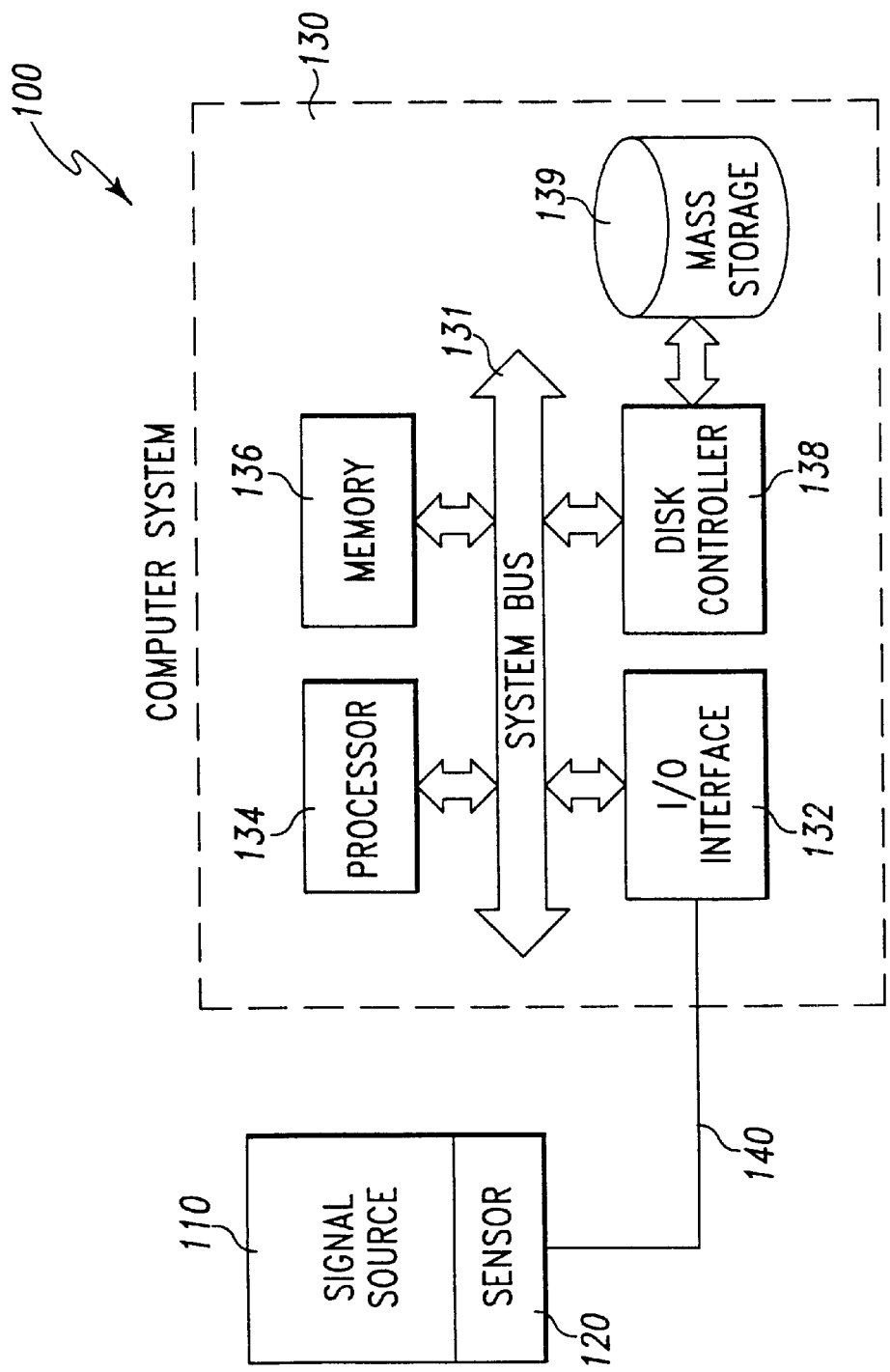
FIG. 1 shows a block diagram of a preferred embodiment of a monitoring system which incorporates features of the present invention therein.

While the invention is susceptible to various modifications and alternative forms, specific embodiments thereof have been shown by way of example in the drawings and will herein be described in detail It should be understood, however, that there is no intent to limit the invention to the particular forms disclosed, but on the contrary, the intention is to cover all modifications, equivalents, and alternatives falling within the spirit and scope of the invention as defined by the appended claims.

FIG. 1 illustrates a monitoring system 100 that incorporates features of the present invention therein. In general, the monitoring system 100 monitors a signal source 110, generates wavelets that are representative of a signal produced by the signal source 110, and stores the wavelets for future reference. To this end, the monitoring system 100 includes a sensor 120 coupled to a computer system 130 via a sense wire 140. In particular the sensor 120 is positioned with respect to the signal source 110 such that the sensor 120 may generate a time-varying monitored signal based upon stimuli generated by the signal source 110. For example, the sensor 120 may be a vibration detector placed in contact with an automotive transmission so that the sensor 120 may generate a monitored signal indicative of the vibrations produced by the automotive transmission during operation.

Figure 2A:
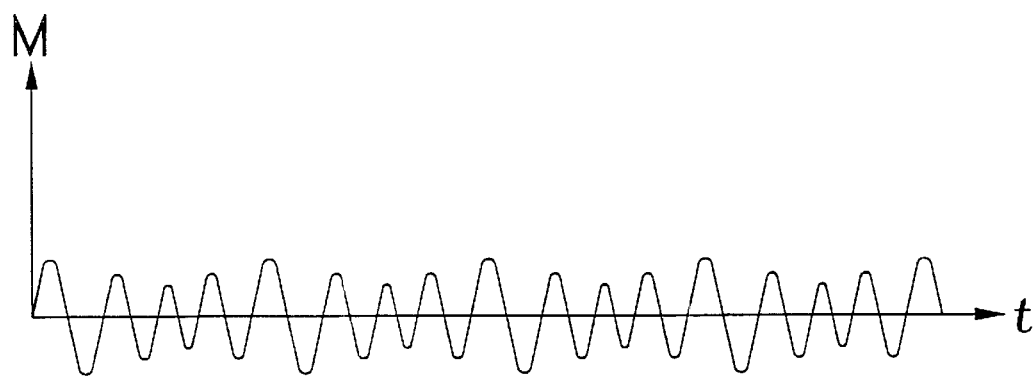
FIGS. 2A–2E graphically illustrates a monitored signal and the processing steps performed by the monitoring system of FIG. 1 to obtain characteristic frequency boundaries from the monitored signal.

Moreover, the sensor 120 may be implemented with various known types of sensors that are responsive to the various types of stimuli produced by the signal source 110. For example, the sensor 120 may be implemented with sensors capable of sensing infrared, ultraviolet, electrical, electromagnetic, acoustical, and/or other types of energy that may be generated by the signal source 110. An exemplary time-varying monitored signal is illustrated in FIG. 2A. As illustrated, the time-varying monitored signal varies in amplitude with respect to time.

The computer system 130 of the monitoring system 100 is operable to process the monitored signal of the sensor 120 in order to construct wavelets representative of the monitored signal. To this end, the computer system 130 includes a system bus 131 which operably couples an I/O interface 132, a processor 134, a memory 136, and a disk controller 138 together.

The I/O interface 132 is operable to receive and digitize the monitored signal produced by the sensor 120. In particular, the I/O interface 132 is operable to sample the monitored signal at a sampling rate greater than the Nyquist frequency for the monitored signal in order to obtain a series of digital words that are representative of the monitored signal. For example, the I/O interface 132 may sample the monitored signal at a sampling rate of 500 kilohertz (KHz). As a result of sampling the monitored signal at the sampling rate, the I/O interface 132 produces a series of digital words which represent the monitored signal generated by the sensor 120.

The processor 134 is operable to execute the instructions stored in the memory 136 and to control the various components of the computer system 130. In particular, the processor 134 may be implemented with a Pentium II processor manufactured by Intel Corporation. However, it should be appreciated by those skilled in the art that the processor 134 may be implemented with processors and/or microcontrollers manufactured by other companies such as AMD, Cyrix, and Motorola.

Moreover, the memory 136 is operable to store instructions and data executed and manipulated by the processor 134. The memory 136 may include ROM (read only memory) and/or RAM (random access memory). In particular, the memory 136 is operable to store instructions which when executed by the processor 134 cause the processor 134 to analyze the monitored signal produced by the sensor 120, construct wavelets that are representative of the monitored signal, and store the wavelets in a mass storage unit 139 (e.g. a disk drive) via the disk controller 138.

Figure 3:
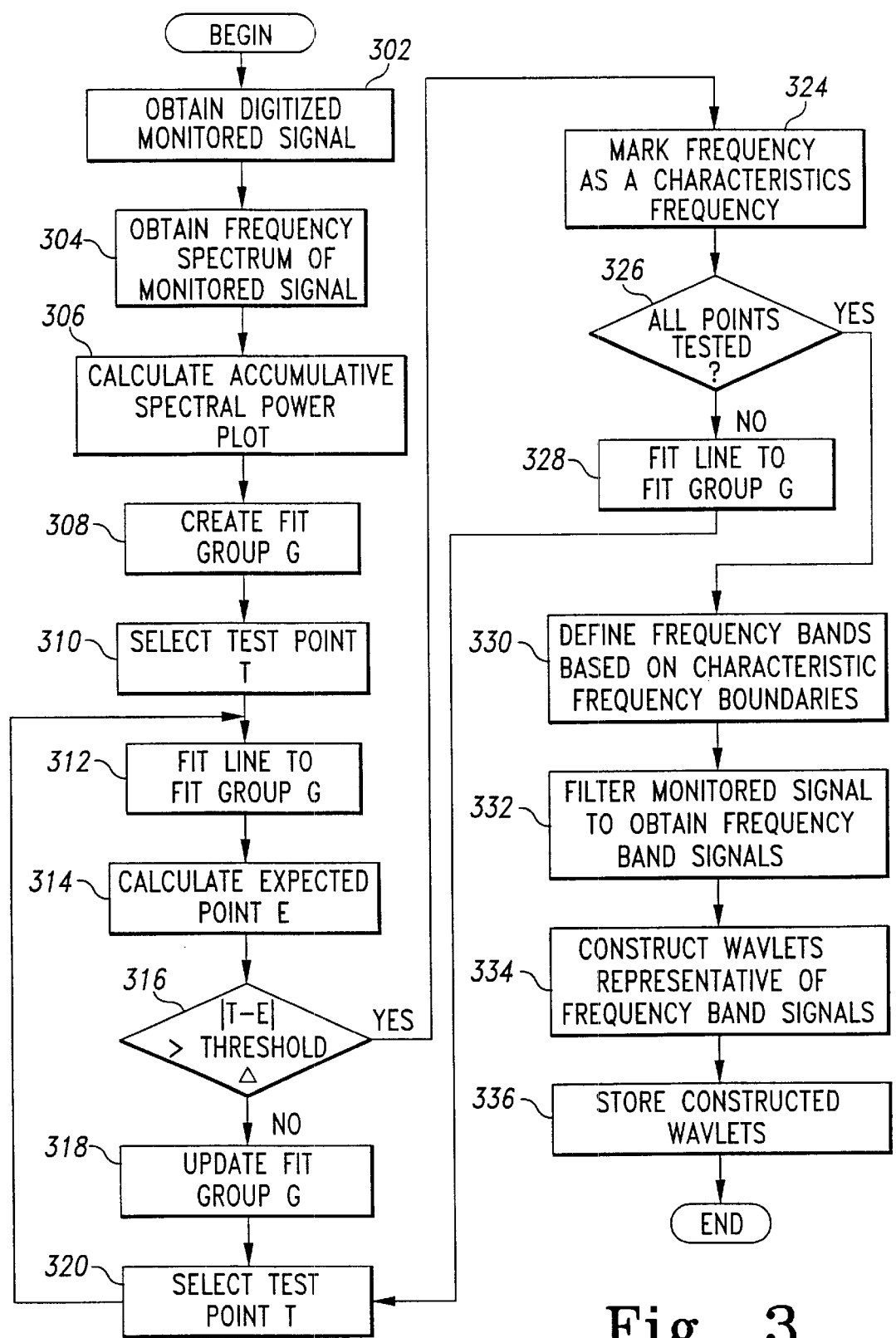
FIG. 3 illustrates a wavelet generation routine used by the monitoring system of FIG. 1 to generate wavelets for representing the monitored signal.

FIG. 3 illustrates a flowchart of a wavelet generation routine 300 stored in the memory 136. In general, the wavelet generation routine 300 constructs wavelets that accurately and efficiently represent the monitored signal received from the sensor 120. The wavelet generation routine 300 begins with the processor 134 in step 302 obtaining from the I/O interface 132 digital words representing a monitored signal that has been digitized by the I/O interface 132. As stated previously, the I/O interface 132 digitizes a monitored signal generated by sensor 120 in response to stimuli of a signal source (e.g. an automotive transmission). An exemplary monitored signal is illustrated in FIG. 2A.

Figure 2B:
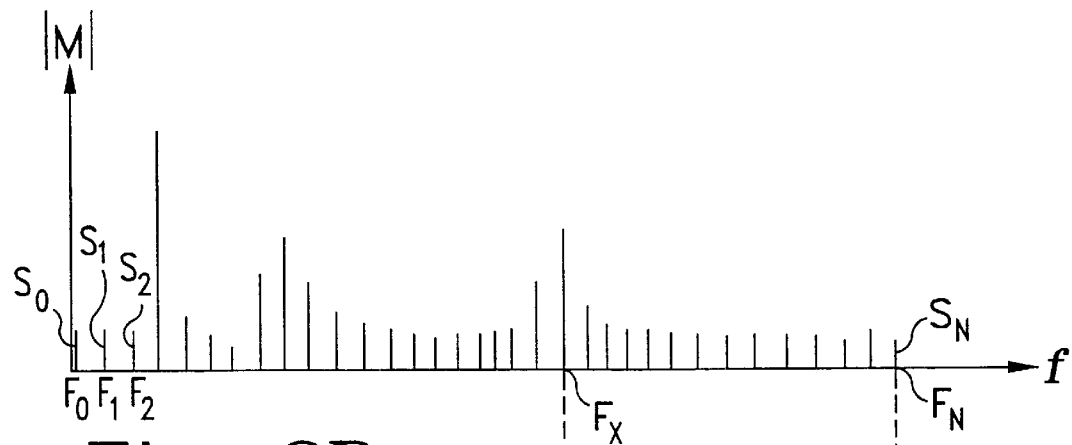

Then in step 304, the processor 134 transforms the digitized monitored signal from the time domain to a frequency domain in order to obtain a frequency spectrum for the digitized monitored signal. To this end, the processor 134 performs a frequency transform operations (e.g. fast Fourier transform (FFT) operations) upon the digitized monitored signal in order to generate a frequency spectrum indicative of the spectral components comprising the monitored signal. An exemplary frequency spectrum is illustrated in FIG. 2B. As illustrated the frequency spectrum includes several spectral components $S_0 \ldots S_N$ each having a corresponding spectral frequency $F_0 \ldots F_N$ and a corresponding spectral magnitude $M_0 \ldots M_N$.

After obtaining the frequency spectrum from the digitized monitored signal, the processor 134 in step 306 calculates an accumulative spectral power plot from the frequency spectrum. Each point $P_0 \ldots P_N$ of the accumulative spectral power plot represents a spectral frequency and the accumulative spectral power represented by the spectral components up to and including the corresponding spectral components $S_0 \ldots S_N$. In the preferred embodiment of the present invention, the processor 134 generates each point $P_0 \ldots P_N$ of the accumulative spectral power plot by summing together the spectral magnitudes $M_0 \ldots M_N$ corresponding to the first spectral component $S_0$ of the frequency spectrum through the spectral component S having the frequency component F. For example, as illustrated in the exemplary spectral power plot of FIG. 2C, the point $P_X$ represents a spectral frequency $F_X$ and an accumulative spectral power equal to the summation of the spectral magnitudes $M_0 \ldots M_X$.

Once the processor 134 has calculated the accumulative spectral power plot, the processor 134 obtains characteristic frequency boundaries from the accumulative spectral power plot by utilizing a line fitting technique. In general, the processor 134 fits lines to the accumulative spectral power plot starting from the last point $P_N$ of the accumulative spectral power plot and working toward the first point $P_0$ of the accumulative spectral power plot, and selects the spectral frequencies corresponding to points of the accumulative spectral power plot that deviate from the fitted lines by more than a threshold amount Δ.

Figure 2C:
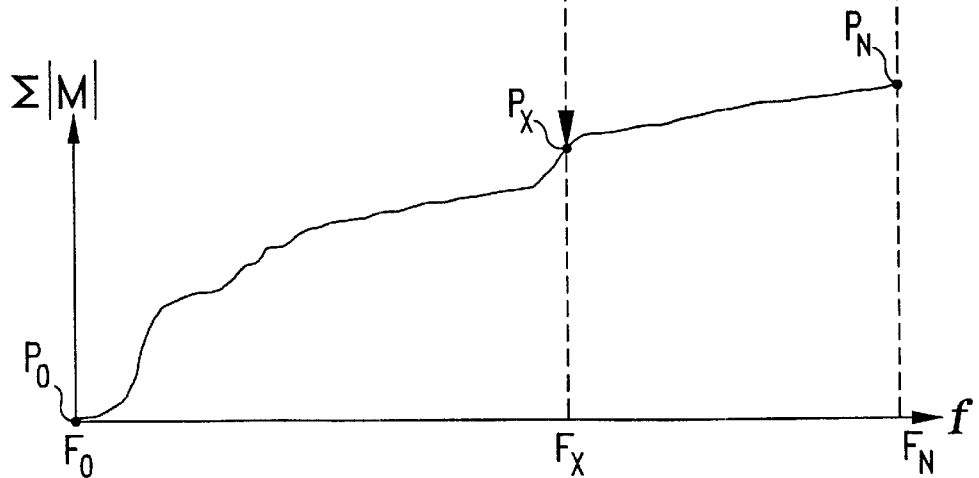
Figure 2D:
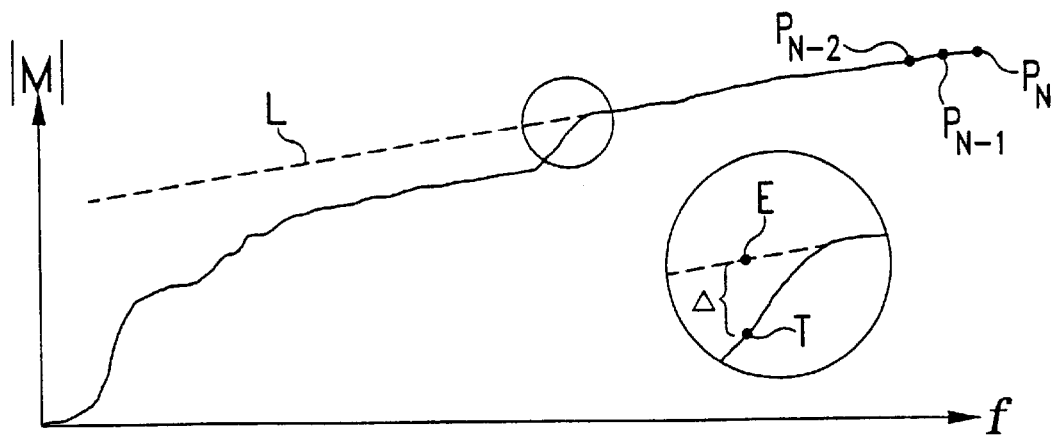

Referring to FIG. 2D, the processor 134 of the preferred embodiment obtains the characteristic frequency boundaries by first creating a fit group G in step 308. In particular, the processor 134 selects the last two points $P_N$ and $P_{N-1}$ of the accumulative spectral power plot 230 for inclusion into the fit group G. Then, the processor 134 in step 310 selects a test point T. In particular, the processor 134 selects the next point $P_{N-2}$ of the accumulative spectral power plot 230 for use as test point T.

In step 312, the processor 134 fits a line L to the points of the fit group G by using a linear regression technique. The processor 134 in step 314 calculates an expected point E corresponding to the same spectral frequency as the test point T. After fitting the line L to the points of the fit group G and calculating the expected point E, the processor 134 determines in step 316 whether the test point T deviates from the line L by more than a threshold amount Δ. In particular, the processor 134 determines whether the difference between the test point T and the expected point E is greater than the threshold amount Δ.

If the processor 134 determines in step 316 that the test point T does not differ from the expected point E by more than the threshold amount Δ, then the processor 134 proceeds to step 318 in order to update the fit group G and select another test point T. The processor 134 in step 318 places the point of the accumulative spectral power plot corresponding to the test point T into the fit group G, and in step 320 selects the next point of the accumulative spectral power plot for the test point T. After updating the fit group G and selecting a new test point T, processor 134 returns to step 312 in order refit the line L to the points of the updated fit group G and test the new test point T.

However, if the processor 134 determines in step 316 that the test point T differs from the expected point E by more than the threshold amount Δ, then the processor 134 proceeds to step 324. In step 324, the processor 134 marks the spectral frequency corresponding to the test point T as a characteristic frequency boundary. Then, the processor 134 in step 326 determines whether all points of the accumulative spectral power plot have been tested. In particular, the processor 134 in the preferred embodiment determines whether the spectral frequency corresponding to the test point T is equal to zero (i.e. whether the test point T corresponds to the DC component of the frequency spectrum).

Figure 2E:
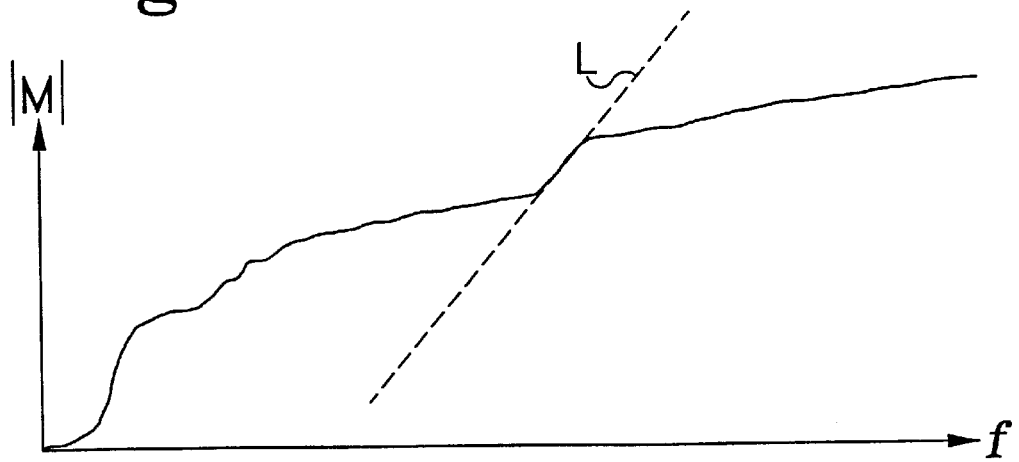

If the processor 134 determines that all points of the accumulative spectral power plot have not been tested, then the processor 134 proceeds to step 328 in order to redefine the fit group G. In particular, the processor 134 in step 324 removes all the points currently included in the fit group G, and then places the current test point T and the previous test point into the fit group G. After redefining the fit group G, the processor 134 proceeds to step 320 in order to select the next test point T and to refit the line L to the points of the redefined fit group G. As a result of redefining the fit group G in the above manner, the refitted line L may have a substantially different slope than the previously fitted line. This substantial change in slope in the line L is illustrated in FIG. 2D and FIG. 2E.

If, however, the processor 134 determines in step 326 that all points of the accumulative spectral power plot have been tested, then the processor 134 proceeds to step 330 in order to define several frequency bands based upon the characteristic frequency boundaries obtained by the processor 134. In general, the processor 134 decimates the obtained characteristic frequency boundaries to obtain cutoff frequencies for the frequency bands. As will be apparent from the below discussion, the number of defined frequency bands also defines the number wavelets used to represent the monitored signal. Accordingly, the processor 134 may control the number of wavelets used to represent the monitored signal by decimating the obtained characteristic frequency boundaries to obtain a desired number of frequency bands.

For example, if the processor 134 has been configured to represent the monitored signal with three wavelets, and ten frequency boundaries have been extracted from the monitored signal, then the processor 134 may achieve the desired number of frequency bands by selecting every $3^{rd}$ ($\lfloor 10 \div 3 \rfloor$= 3) characteristic frequency.

The processor 134 may also define the frequency bands so that the number of wavelets used to represent the monitored signal is dependant upon the monitored signal itself. For example, the processor 134 may select characteristic frequency boundaries such that each frequency band defines a separate frequency interval that is greater than a threshold frequency interval Φ. Alternatively, the processor 134 may select characteristic frequency boundaries based upon the accumulative spectral power plot. In particular, the processor 134 may select the characteristic frequency boundaries such that each resulting frequency band spans a change in spectral power that is greater than a threshold percentage (e.g. 20%) of the total spectral power.

After defining the frequency bands, the processor 134 in step 332 filters the monitored signal with respect to the defined frequency bands. In particular, the processor 134 filters the monitored signal with respect to a first frequency band (e.g. 0 KHz to 20 KHz) to obtain a first frequency band signal that represents a first portion of the monitored signal corresponding to the first frequency band. Moreover, the processor 134 filters the monitored signal with respect to a second frequency band (e.g. 20 KHz to 40 KHz) to obtain a second frequency band signal that represents a second portion of the monitored signal corresponding to the second frequency band. Moreover, the processor 134 filters the monitored signal such that each frequency band signal has the same phase delay (e.g. +30°) between it and its corresponding portion of the monitored signal. In a preferred embodiment the processor 134 in filtering the monitored signal introduces a zero phase delay.

Then in step 334, the processor 134 generates a wavelet for each frequency band signal produced in step 332. In particular, the processor 134 utilizes an autoregression technique to generate a wavelet for each frequency band signal. Specifically, the processor 134 in utilizing the autoregression technique generates values which represent the corresponding frequency band signals. Autoregression techniques are well known in the art and are described in (i) U.S. Pat. No. 5,566,092 to Wang et al., (ii) H. Akaike, "Power Spectrum Estimation through Autoregression Model Fitting," Ann. Inst. Stat. Math., Vol. 21, 1969, and (iii) H. Akaike, "A New Look at the Statistical Model Identification," IEEE Trans. Autom. Control, Vol. AC-19, December 1974. The disclosures of the above three publications are hereby incorporated by reference.

The processor 134, in step 336, stores the wavelets obtained from step 334 on the mass storage device 139. In particular, the processor 134 stores the values defining the various wavelets obtained from performing the autoregression technique. Moreover, the processor 134 may store a timestamp along with the wavelet values to indicate when the wavelets occurred. In this manner, the processor 134 need only store wavelets that substantially differ from previous wavelets. If the processor 134 has generated a good wavelet family for representing the monitored signal, then the individual wavelet members of the family should be relatively stable over time. As a result, the processor 134 may go extended periods of time without storing values in the mass storage device 139.

The processor 134 may further monitor the repeatability of the generated wavelets and change criteria used to define the wavelets in order to attempt to increase the repeatability level. For example, the processor 134 may increase or decrease a threshold level so that the number of wavelet members of the wavelet family is changed or that the frequency bands for generating the wavelet members is changed. In this manner, the processor 134 may obtain a wavelet family that accurately and efficiently represents the monitored signal.

Figure 4:
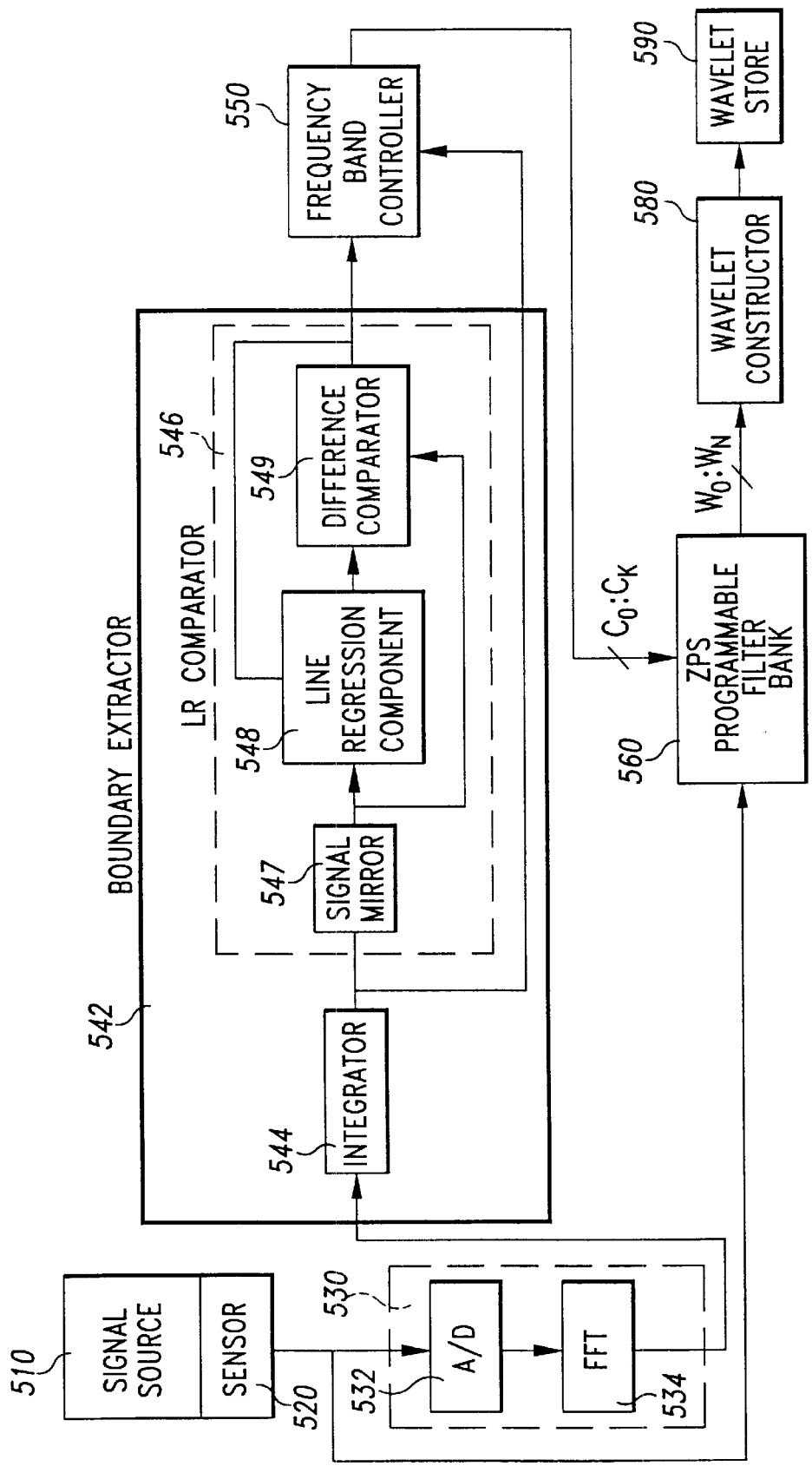
FIG. 4 illustrates an alternative embodiment of the monitoring system of FIG. 1.

An alternative embodiment of a monitoring system 500 is illustrated in FIG. 4. The monitoring system 500 includes a sensor 520, a spectral analyzer 530, a boundary extractor 540, a frequency band controller 550, a programmable filter bank 560, a wavelet constructor 580, and a wavelet store 590. The sensor 520 operates in the same manner as the sensor 120 of FIG. 1. Accordingly, the sensor 520 will not be discussed in further detail.

The spectral analyzer 530 of the stencil construction system 500 is coupled to the sensor 520 in order to receive a monitored signal produced by the sensor 520. In particular, the sensor 520 produces the monitored signal in response to stimuli generated by a signal source 510 such as an automotive component. Moreover, the spectral analyzer 530 is operable to digitize the received monitored signal, and transform the digitized monitored signal from the time domain to the frequency domain. To this end, the spectral analyzer 530 includes an analog-to-digital (A/D) converter 532 that is coupled to the sensor 520, and a frequency transform processor 534 such as a FFT processor that is coupled to the A/D converter 532. In particular, the A/D converter 532 samples the monitored signal at a sampling rate greater than the Nyquist rate for the monitored signal in order to produce a series of digital words which represent the magnitude of the monitored signal at different points in time. For example, the A/D converter 532 may sample the monitored signal at 500 kilohertz (KHz) in order to produce a digitized monitored signal comprising 500 samples per a millisecond (msec).

The frequency transform processor 534 is operable to received the digitized monitored signal from the A/D converter 532, and generate a frequency spectrum from the digitized monitored signal. Specifically, the frequency transform processor 534 performs frequency transform operations such as FFT operations upon the samples generated by the A/D converter 532 in order to produce a frequency spectrum having spectral components which are representative of the frequency content of the monitored signal produced by the sensor 520. In particular, the frequency transform processor 534 outputs the frequency spectrum starting with the DC component of the monitored signal followed by increasingly higher spectral frequency components. An exemplary frequency spectrum is illustrated in FIG. 2B.

The boundary extractor 542 is coupled to the spectral analyzer 530 in order to receive the frequency spectrum of the monitored signal. In general, the boundary extractor 542 is operable to extract characteristic frequency boundaries from the received frequency spectrum. In order to extract characteristic frequency boundaries from the received frequency spectrum, the boundary extractor 542 includes an integrator 544 and a linear regression comparator 546.

The integrator 544 is coupled to the spectrum analyzer 530 in order to receive the frequency spectrum of the monitored signal. Moreover, the integrator 544 is operable to sum the spectral magnitudes of the frequency spectrum together in order to generate an accumulative spectral power signal which starts from the spectral power of the DC component of the frequency spectrum and proceeds to the total spectral power of the frequency spectrum.

The linear regression comparator 546 is coupled to the integrator 544 in order to receive the accumulative spectral power signal. In general, the linear regression comparator 546 generates an include signal each time the linear regression comparator 546 determines that a certain frequency of the frequency spectrum is a characteristic frequency boundary of the frequency spectrum. In this manner, the linear regression comparator 546 is operable to extract the characteristic frequency boundaries for the monitored signal.

In particular, as depicted in FIG. 2C, the linear regression comparator 546 fits lines to the accumulative spectral power signal starting from the total spectral power of the frequency spectrum and working toward the spectral power of the DC component of the frequency spectrum. To this end, the linear regression comparator 546 includes a signal mirror 547, a linear regression component 548, and a difference comparator 549. The signal mirror 547 is coupled to the integrator 544 in order to obtain the accumulative spectral power signal. Moreover, the signal mirror 547 is operable to mirror the accumulative spectral power signal in order to produce a mirrored accumulative spectral power signal which starts with the total spectral power of the monitored signal and proceeds to the spectral power of the DC component of the frequency spectrum.

The linear regression component 548 is coupled to the signal mirror 547 in order to receive the mirrored accumulative spectral power signal. As illustrated in FIG. 2D, the linear regression component 548 generates an expected level E for the mirrored accumulative spectral power signal by fitting lines to the mirrored accumulative spectral power signal starting with the total spectral power of the monitored signal and proceeding toward the spectral power of the DC component of the frequency spectrum. In particular, the linear regression component 548 continually updates the expected level E based upon a portion of the mirrored accumulative spectral power signal since the last extracted characteristic frequency boundary. In other words, as depicted in FIG. 2E, the linear regression component 548 resets its line fitting each time the linear regression component 548 receives an include signal from the difference comparator 549.

The difference comparator 549 is coupled to the linear regression component 548 in order to receive the expected level E, and to the signal mirror 549 in order to receive the mirrored accumulative spectral power signal. The difference comparator 549 is operable to determine whether a frequency is a characteristic frequency boundary of the monitored signal. The difference comparator 549 makes this determination by comparing the expected level E to the mirrored accumulative spectral power signal. If the expected level E differs from the mirrored accumulative spectral power signal by more than a threshold amount Δ, then the difference comparator 549 generates an include signal. The include signal indicates that the frequency corresponding to the current level of the mirrored accumulative spectral power signal is a characteristic frequency boundary of the monitored signal.

The frequency band controller 550 is coupled to (i) the boundary extractor 540 in order to receive the include signal, and (ii) the signal mirror 547 in order to receive the mirrored frequency spectrum. In general, the frequency band controller 550 defines frequency bands based upon the characteristic frequency boundaries indicated by the include signal of the boundary extractor 540, and configures the programmable filter bank 560 to filter the monitored signal with respect to defined frequency bands.

To this end, the frequency band controller 550 decimates (i.e. selects a portion of) the characteristic frequency boundaries indicated by the include signal of the boundary extractor 542 in order to obtain cutoff frequencies that define frequency bands. As will be apparent from the below discussion, the number of defined frequency bands also defines the number wavelets used to represent the monitored signal. Accordingly, the frequency band controller 550 may control the number of wavelets used to represent the monitored signal by decimating the extracted characteristic frequency boundaries to obtain a desired number of frequency bands.

For example, the frequency band controller 550 may be configured to define four frequency bands, thus resulting in four wavelets for representing the monitored signal. If the boundary extractor 542 indicates ten characteristic frequency boundaries for the monitored signal, then the frequency band controller 550 may achieve the desired number of frequency bands by selecting every $2^{nd}$ ($\lfloor 10 \div 4 \rfloor = 2$) characteristic frequency.

The frequency band controller 550 may also define the frequency bands so that the number of wavelets used to represent the monitored signal is dependant upon the monitored signal itself. For example, the frequency band controller 550 may select characteristic frequency boundaries such that each frequency band defines a separate frequency interval that is greater than a threshold frequency interval Φ. Alternatively, the frequency band controller 550 may select characteristic frequency boundaries based upon the accumulative spectral power signal generated by the integrator 544. In particular, the frequency band controller 550 may select the characteristic frequency boundaries such that each resulting frequency band spans a change in spectral power that is greater than a threshold percentage of the total spectral power.

For example, if the threshold percentage were equal to 20%, then the frequency band controller 550 would (i) select for a first cutoff frequency, the first characteristic frequency boundary that corresponds to a first point of the accumulative spectral plot greater than or equal to 20% of the total spectral power of the frequency spectrum, and (ii) select for a second cutoff frequency, a second characteristic frequency boundary that corresponds to a second point of the accumulative spectral plot that is greater than or equal to the first point of the accumulative spectral plot plus 20% of the total spectral power of the frequency spectrum. In this manner, the frequency band controller 550 would define at most five cutoff frequencies and therefore at most six frequency bands.

As stated above, the frequency band controller 550 is also operable to configure the programmable filter bank 560 to filter the monitored signal with respect to the defined frequency bands. In particular, the frequency band controller 550 is operable to configure the programmable filter bank 560 to utilize the obtained cutoff frequencies which define the frequency bands. More specifically, the programmable filter bank 560 programs the programmable filter bank 560 by generating control signals upon the control lines $C_0 \ldots C_K$.

The programmable filter bank 560 is coupled to (i) the sensor 520 in order to receive the monitored signal, and (ii) the frequency band controller 550 in order to receive cutoff frequencies which define frequency bands. In general, the programmable filter bank 560 filters the monitored signal such that a frequency band signal is produced for each defined frequency band received from the frequency band controller 550. Each frequency band signal specifically represents a portion of the monitored signal corresponding to a defined frequency band.

Moreover, the programmable filter bank 560 in the preferred embodiment introduces the same amount of phase delay into each of the frequency band signals. In other words, if a first frequency band signal has a phase delay of −20° with respect to its respective portion of the monitored signal, then all of the frequency band signals have a phase delay of −20° with respect to their respective portion of the monitored signal. By generating the frequency band signals such that all frequency band signals have the same phase delay, the wavelets produced by the wavelet constructor 580 more accurately represent the monitored signal.

Figure 5:
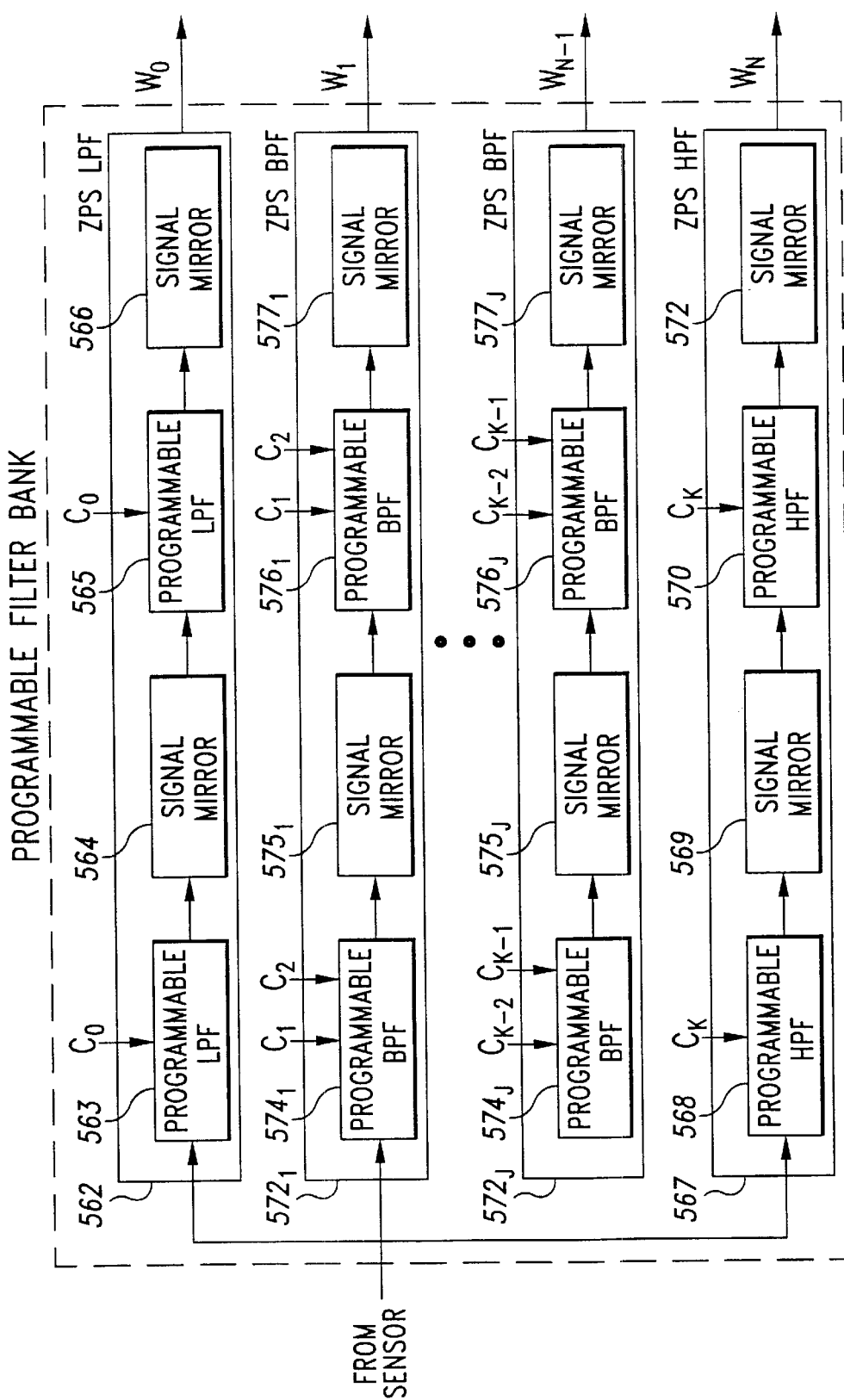
FIG. 5 illustrates the programmable filter bank of the monitoring system of FIG. 4.

To this end, the programmable filter bank 560, as depicted in FIG. 5, includes a zero phase shift (ZPS) low pass filter (LPF) module 562, a ZPS high pass filter (HPF) module 567, and several ZPS band pass filter (BPF) modules $572_1 \ldots 572_J$. In general, the ZPS LPF module 562 is operable to low pass filter the monitored signal without introducing any phase delay (i.e. a phase delay of 0°) based upon a higher cutoff frequency received from the frequency band controller 550.

To this end, the ZPS LPF module 562 includes a first programmable LPF 563. The first programmable LPF 563 is coupled to (i) the sensor 520 in order to receive the monitored signal, and (ii) the frequency band controller 550 via the control line $C_0$ in order to receive the high cutoff frequency. The first programmable LPF 565 is operable to produce a first phase shifted (PS) frequency band signal that corresponds to a first frequency band of the monitored signal that has been phased delayed. For example, if the first programmable LPF 565 were to receive a high cutoff frequency equal to 10 KHz from the frequency band controller 550, then the first programmable LPF 565 would filter out the portion of the monitored signal corresponding to frequencies greater than 10 KHz in order to produce a first PS frequency band signal that corresponds to the frequencies of the monitored signal that are less than 10 KHz.

However, in filtering the monitored signal, the first programmable LPF modules 565 also introduces a phase delay which varies with respect to the programmed high cutoff frequency. As a result, in order to ensure the same phase delay across the programmable filter modules 562, 567, $572_1 \ldots 572_J$, the ZPS LPF module removes the variable phase delay introduced by the first programmable LPF 563. To this end, the ZPS LPF module 562 includes a first signal mirror 564, a second programmable LPF 565, and a second signal mirror 566.

The first signal mirror 564 is coupled to the first programmable LPF 563 in order to receive the first PS frequency band signal. The first signal mirror 564 is operable to mirror the first PS frequency band signal in order to produce a mirrored version of the first PS frequency band signal. In particular, if the first PS frequency band signal comprises digital samples running from $DS_0$ to $DS_Y$, then the signal mirror 564 is operable to reverse the order of the digital samples $DS_0 \ldots DS_Y$ in order to produce a first mirrored PS (MPS) frequency band signal that comprises digital samples that run from $DS_Y$ to $DS_0$.

The second programmable LPF 565 is coupled to (i) the first signal mirror 564 in order to receive the first MPS frequency band signal, and (ii) the frequency band controller 550 in order to receive the high cutoff frequency via the control line $C_0$. The second programmable LPF 565 is preferably identical to first programmable LPF 563. As a result, the second programmable LPF 565 is operable to filter the first MPS frequency band signal with the same band pass as the first programmable LPF 563. Since the first MPS frequency band signal resulted from the first programmable LPF 563 filtering the monitored signal with the same band pass as the second programmable LPF 565, the first MPS frequency band signal should not contain in frequencies for the second programmable LPF 565 to filter out.

However, while the second programmable LPF 565 should not filter out any of the frequencies of the first MPS frequency band signal, the second programmable LPF 565 should introduce the same phase delay into the filtered signal as the first programmable LPF 563. Since the second programmable LPF 565 filters a mirrored representation of the first PS frequency band signal produced by the first programmable LPF 563, the second programmable LPF 565 essentially cancels out the phase delay introduced by the first programmable LPF 563 to produce a first mirrored frequency band signal.

The second signal mirror 566 is coupled to the second programmable LPF 565 in order to receive the first mirrored frequency band signal. The second signal mirror 566 is operable to mirror the first mirrored frequency band signal in order to produce a first frequency band signal representative of a first frequency band of the monitored signal (e.g. the 0 KHz to 20 KHz frequency band of the monitored signal). In particular, the first frequency band signal as a result of the above mirroring and filtering should be in phase (i.e. zero phase delay) with the portion of the monitored signal corresponding to the first frequency band.

In general, the ZPS HPF module 567 is operable to high pass filter the monitored signal without introducing any phase delay (i.e. a phase delay of 0°) based upon a low cutoff frequency received from the frequency band controller 550. To this end, the ZPS HPF module 567 is coupled to (i) the sensor 120 in order to receive the monitored signal, and (ii) the frequency band controller 550 in order to receive the low cutoff frequency via control line $C_K$. In particular, the ZPS LPF module 567 includes a first programmable HPF 568, a first signal mirror 569, a second programmable HPF 570, and a second signal mirror 572.

The first programmable HPF 568, the first signal mirror 569, the second programmable HPF 570, and the second signal mirror 572 cooperate in a manner similar to the components of the ZPS LPF module 562 to produce the second frequency band signal representative of a second frequency band of the monitored signal. For example, if ZPS HPF module 567 receives a low cutoff frequency of 100 KHz from the frequency band controller 550, then the first programmable HPF 568, the first signal mirror 569, the second programmable HPF 570, and the second signal mirror 572 cooperate to filter out the frequencies of the monitored signal below 100 KHz to produce a second frequency band signal corresponding to the frequencies of the monitored signal greater than 100 KHz.

In general, each ZPS BPF module $572_X$ is operable to band pass filter the monitored signal without introducing any phase delay (i.e. a phase delay of 0°) based upon a low and a high cutoff frequency received from the frequency band controller 550. To this end, the ZPS BPF module $572_1$ is coupled to (i) the sensor 120 in order to receive the monitored signal, and (ii) the frequency band controller 550 in order to receive a low and a high cutoff frequency via control lines $C_1$ and $C_2$.

In particular, the ZPS BPF module $572_1$ includes a first programmable BPF $574_1$, a first signal mirror $575_1$, a second programmable BPF $576_1$, and a second signal mirror $577_1$. The first programmable BPF $574_1$, the first signal mirror $575_1$, the second programmable BPF $576_1$, and the second signal mirror $577_1$ cooperate in a manner similar to the components of the ZPS LPF module 562 to produce a third frequency band signal representative of a third frequency band of the monitored signal. For example, if the ZPS BPF module $572_1$ receives a low cutoff frequency of 20 KHz and a high cuttoff frequency of 40 KHz from the frequency band controller 550, then the first programmable BPF $574_1$, the first signal mirror $575_1$, the second programmable BPF $576_1$, and the second signal mirror $577_1$ cooperate to filter out the frequencies of the monitored signal below 20 KHz and the frequencies of the monitored signal above 40 kHz to produce a third frequency band signal corresponding to the frequencies of the monitored signal between 20 KHz and 40 KHz.

The wavelet constructor 580 in general is operable (i) to receive the frequency band signals produced by the programmable filter bank 560, and generate a separate wavelet for each of the received frequency band signals. To this end the wavelet constructor 580 is coupled to the programmable filter bank 560 in order to receive the frequency band signals. Moreover, the wavelet constructor 580 is operable to perform an autoregression technique upon each received frequency band signal to generate a wavelet for each frequency band signal. Specifically, the wavelet constructor 580 is operable to generate values which represent the corresponding frequency band signals, and store the generated values in the wavelet store 590 (e.g. a disk drive, tape drive, RAID device, or other storage device).

The wavelet constructor 580 may also store a timestamp along with the wavelet values to indicate when the wavelets occurred. In this manner, the wavelet constructor 580 need only store wavelets that substantially differ from previous wavelets. If the monitoring system 500 generates a good wavelet family for representing the monitored signal, then the individual wavelet members of the family should be relatively stable over time. As a result, the wavelet constructor 580 may go extended periods of time without storing values in the wavelet store 590.

The wavelet constructor 580 may be further operable to monitor the repeatability of the generated wavelets and change criteria used by the frequency band controller 550 in order to increase the repeatability level. For example, the wavelet constructor 580 may increase or decrease a threshold level so that the number of wavelet members of the wavelet family is changed or that the frequency bands for generating the wavelet members are changed. In this manner, The wavelet constructor 580 may obtain a wavelet family that accurately and efficiently represents the monitored signal.

While the invention has been illustrated and described in detail in the drawings and foregoing description, such illustration and description is to be considered as exemplary and not restrictive in character, it being understood that only preferred embodiments have been shown and described and that all changes and modifications that come within the spirit of the invention are desired to be protected.

What is claimed is:

1. A method for defining a plurality of wavelets that represent a first signal, comprising the steps of:
   generating a first frequency band signal representative of a first frequency band of said first signal;
   generating a second frequency band signal representative of a second frequency band of said first signal;
   defining a first wavelet of said plurality of wavelets to represent said first frequency band signal; and
   defining a second wavelet of said plurality of wavelets to represent said second frequency band signal.

2. The method of claim 1, further comprising the step of:
   analyzing said first signal to obtain a plurality of characteristic frequency boundaries for said first signal,
   wherein said step of generating said first frequency band signal comprises the step of defining said first frequency band based upon said plurality of characteristic frequency boundaries.

3. The method of claim 2, wherein said step of generating said first frequency band signal further comprises the steps of:
   defining a first pass band based upon said plurality of characteristic frequency boundaries; and
   filtering said first signal with respect to said first pass band in order to obtain said first frequency band signal representative of said first frequency band of said first signal.

4. The method of claim 1, further comprising the steps of:
   analyzing said first signal to obtain a plurality of characteristic frequency boundaries for said first signal; and
   decimating said plurality of characteristic frequency boundaries in order to define a plurality of frequency bands,
   wherein said step of generating said first frequency band signal comprises the step of selecting said first frequency band from said plurality of frequency bands.

5. The method of claim 4, wherein said decimating step comprises the steps of:
   selecting every $N^{th}$ characteristic frequency boundary of said plurality of characteristic frequency boundaries, where N is an integer; and
   defining said plurality of frequency bands based upon said selected characteristic frequency boundaries.

6. The method of claim 4, wherein said analyzing step comprises the steps of:
   calculating an accumulative spectral power plot of said first signal, and
   selecting said plurality of characteristic frequency boundaries based upon said accumulative spectral power plot.

7. The method of claim 1, wherein said first wavelet defining step comprises the step of:
   utilizing autoregression to generate a plurality of values representative of said first frequency band signal.

8. A wavelet generator for defining a plurality of wavelets that represent a first signal, comprising a processor, and a memory having stored therein a plurality of instructions which when executed by said processor cause said processor to:
   generate a first frequency band signal representative of a first frequency band of said first signal;
   generate a second frequency band signal representative of a second frequency band of said first signal;
   define a first wavelet of said plurality of wavelets to represent said first frequency band signal; and
   define a second wavelet of said plurality of wavelets to represent said second frequency band signal.

9. The wavelet generator of claim 8, wherein said plurality of instructions when executed by said processor further cause said processor to:
   analyze said first signal to obtain a plurality of characteristic frequency boundaries for said first signal; and
   define said first frequency band based upon said plurality of characteristic frequency boundaries.

10. The wavelet generator of claim 9, wherein said plurality of instructions when executed by said processor further cause said processor to:
    define a first pass band based upon said plurality of characteristic frequency boundaries; and
    filter said first signal with respect to said first pass band in order to obtain said first frequency band signal.

11. The wavelet generator of claim 8, wherein said plurality of instructions when executed by said processor further cause said processor to:
    analyze said first signal to obtain a plurality of characteristic frequency boundaries for said first signal;
    decimate said plurality of characteristic frequency boundaries in order to define a plurality of frequency bands; and select said first frequency band from said plurality of frequency bands.

12. The wavelet generator of claim 8, wherein said plurality of instructions when executed by said processor further cause said processor to:

analyze said first signal to obtain a plurality of characteristic frequency boundaries for said first signal;

decimate said plurality of characteristic frequency boundaries by selecting every $N^{th}$ characteristic frequency boundary of said plurality of characteristic frequency boundaries, where N is an integer;

define a plurality of frequency bands based upon said selected characteristic frequency boundaries; and select said first frequency band from said plurality of frequency bands.

13. The wavelet generator of claim 8, wherein said plurality of instructions when executed by said processor further cause said processor to:

calculate an accumulative spectral power plot from said first signal;

select a plurality of characteristic frequency boundaries for said first signal based upon said accumulative spectral power plot;

decimate said plurality of characteristic frequency boundaries in order to define a plurality of frequency bands; and select said first frequency band from said plurality of frequency bands.

14. The wavelet generator of claim 8, wherein said plurality of instructions when executed by said processor further cause said processor to:

generate said first wavelet by utilizing autoregression to generate a plurality of values representative of said first frequency band signal.

15. A wavelet generator for defining a plurality of wavelets that represent a first signal, comprising:

a programmable filter bank operable to (i) receive said first signal, and (ii) filter said first signal based upon a plurality of frequency bands to obtain a plurality of frequency band signals that each represent a frequency band of said first signal; and a frequency band controller coupled to said programmable filter bank, said frequency band controller operable to (i) receive said first signal, (ii) obtain said plurality of frequency bands from said first signal, and (iii) program said programmable filter bank with said plurality of frequency bands; and a wavelet constructor coupled to said programmable filter bank, said wavelet constructor operable to (i) receive said plurality of frequency band signals, and (ii) generate a separate wavelet for each of said plurality of frequency band signals.

16. The wavelet generator of claim 15, wherein said wavelet constructor comprises:

an autoregression component that is operable to (i) receive a first frequency band signal of said plurality of frequency band signals, and (ii) generate a first wavelet comprising a plurality of values representative of said first frequency band signal.

17. The wavelet generator of claim 15, wherein said programmable filter bank comprises:

a first programmable filter module that is operable to filter said first signal to produce a first frequency band signal which differs in phase from a first frequency band of said first signal by a first phase difference amount; and a second programmable filter module that is operable to filter said first signal to produce a second frequency band signal which differs in phase from a second frequency band of said first signal by a second phase difference amount, wherein said first phase difference amount and said second phase difference amount are substantially equal.

18. The wavelet generator of claim 17, wherein:

said first phase difference amount and said second phase difference amount are substantially equal to zero.

19. The wavelet generator of claim 18, further including:

a spectral analyzer operable to (i) receive said first signal, and (ii) generate a frequency spectrum from said first signal;

a boundary extractor coupled to said spectral analyzer, said boundary extractor operable to (i) receive said frequency spectrum from said spectral analyzer, and (ii) obtain from said frequency spectrum a plurality of characteristic frequency boundaries for said first signal;

wherein said frequency band controller comprises a decimator coupled to said boundary extractor, said decimator operable to (i) receive said plurality of characteristic frequency boundaries from said boundary extractor, and (ii) decimate said plurality of characteristic frequency boundaries in order to obtain said plurality of frequency bands.

20. The wavelet generator of claim 19, wherein said boundary extractor comprises:

an integrator coupled to said spectral analyzer, said integrator operable to (i) receive said frequency spectrum, and (ii) generate an accumulative sum signal that is representative of the accumulative spectral power of said frequency spectrum; and a linear regression component coupled to said integrator, said linear regression component operable to (i) receive said accumulative sum signal, (ii) fit a first line to said accumulative sum signal, said first line representing the slope of a portion of said accumulative sum signal, and (iii) cause a first frequency to be included in said plurality of characteristic boundary frequencies in response to a first accumulative spectral power value of said accumulative sum signal deviating from the magnitude of said first line at said first frequency by more than a threshold amount.

* * * * *